United States Patent [19]

Okita et al.

[11] 4,448,848

[45] May 15, 1984

[54] MAGNETIC RECORDING MEDIUM AND PROCESS FOR PRODUCING THE SAME

[75] Inventors: Tsutomu Okita; Kyoichi Naruo, both of Shizuoka, Japan

[73] Assignee: Fuji Photo Film Co., Ltd., Kanagawa, Japan

[21] Appl. No.: 345,903

[22] Filed: Feb. 4, 1982

[30] Foreign Application Priority Data

Feb. 4, 1981 [JP] Japan .................................. 56-15391

[51] Int. Cl.$^3$ ............................................. H01F 10/02
[52] U.S. Cl. ..................................... 428/447; 427/44; 427/128; 427/130; 428/694; 428/697; 428/900
[58] Field of Search ............................... 427/128–132, 427/48, 44; 428/900, 447, 694, 697; 252/62.54

[56] References Cited

U.S. PATENT DOCUMENTS 4,004,997  1/1977  Tsukamoto et al. .................. 427/44
4,336,309  6/1982  Jackel et al. ...................... 427/44 X

*Primary Examiner*—Bernard D. Pianalto
*Attorney, Agent, or Firm*—Sughrue, Mion, Zinn, Macpeak and Seas

[57] ABSTRACT

A magnetic recording medium and a process for producing a magnetic recording medium are disclosed, the process comprising the steps of applying onto a nonmagnetic base a magnetic coating composition comprising (1) a compound having a carbon-carbon unsaturated bond polymerizable by electron beams, (2) a coupling agent having a carbon-carbon unsaturated bond, (3) ferromagnetic particles, and (4) an organic solvent, and curing the applied magnetic coating composition by irradiation with electron beams.

9 Claims, No Drawings

MAGNETIC RECORDING MEDIUM AND PROCESS FOR PRODUCING THE SAME

FIELD OF THE INVENTION

The present invention relates to a magnetic recording medium and a process for producing the same, and more particularly, to a magnetic recording medium having good electric characteristics and high wear resistance.

BACKGROUND OF THE INVENTION

Most conventional magnetic recording mediums are produced using a binder of a thermoplastic resin such as vinyl chloride acetate resin, vinyl chloride/vinylidene chloride resin, cellulose resin, acetal resin, urethane resin, and acrylonitrile butadiene resin, which are used either alone or in combination. However, one defect of such mediums is that the magnetic layer is unsatisfactorily wear-resistant and tends to foul the tape transport path.

Methods are known that use a thermosetting resin such as melamine resin or urea resin or blend the thermoplastic resins described above with a binder that forms crosslinkages by chemical reaction, such as an isocyanate compound or an epoxy compound. However, such crosslinkable binders have two important disadvantages: (1) the resin solution having magnetic particles dispersed therein does not have long keeping quality (i.e., has a short pot life) and the resulting magnetic coating composition, and hence the magnetic tape, tends not to have consistent physical properties; and (2) after drying the applied magnetic coating composition, it must be heated for curing, and this results in prolonged processing time.

To overcome these disadvantages, Japanese Pat. No. 12423/72 and Japanese patent application (OPI) Nos. 13639/72, 15104/72 and 77433/75 (the term "OPI" as used herein refers to a "published unexamined Japanese patent application") purpose methods for producing a magnetic recording medium which use a binder of an acrylate ester oligomer and monomer and cure the dried magnetic coating composition by irradiation with electron beams. However, such methods are not capable of producing a magnetic recording medium having good electrical characteristics and mechanical properties.

There has been an increasing demand for providing magnetic recording media with better electrical characteristics by using a magnetic coating composition comprising a good dispersion of ferromagnetic particles. A poor dispersion of ferromagnetic particles can cause low output or noise. The conventional method of curing the magnetic coating composition by electron beams is not satisfactory since if a high concentration of magnetic particles are contained therein to achieve higher-density recording, the resulting magnetic coating composition has a short pot life and cannot provide a magnetic tape having electrical characteristics that withstand practical use. On the other hand, a thin base is required for achieving extended recording, and to meet this requirement, the mechanial properties of the magnetic coating composition must be improved.

Furthermore, with the use of multi-functional video cassette recorders, there has been a demand for video tape that withstands service under hostile conditions, but it has not yet been possible to prepare a magnetic recording medium having sufficiently satisfactory mechanical properties.

SUMMARY OF THE INVENTION

One object of the present invention is to provide a magnetic recording medium having good electrical characteristics and a process for producing such magnetic recording medium.

Another object is to provide a magnetic recording medium having a magnetic layer having good mechanical properties and a process for producing such magnetic recording medium.

Still another object is to provide a process for producing a magnetic recording medium that uses a magnetic coating composition having a long pot life and uniform physical properties.

A further object is to provide a magnetic recording medium having high wear resistance and a process for producing such magnetic recording medium.

A still further object is to provide a process for producing a magnetic recording medium that obviates the heating step for curing the applied magnetic coating composition.

To meet the above objects, the present inventors have made extensive studies on methods of using thermoplastic and thermosetting binders, methods of using a binder that forms crosslinkages by chemical reaction, and methods of using a binder that cures upon irradiation with electron beams, and have accomplished the invention described hereunder.

The objects of the present invention can be achieved by applying onto a non-magnetic base a magnetic coating composition containing the four materials listed below, and then curing the applied layer by irradiation with electron beams:

(1) a compound having a carbon-carbon unsaturated bond polymerizable by electron beams;
(2) a coupling agent having a carbon-carbon unsaturated bond;
(3) ferromagnetic particles; and
(4) an organic solvent.

According to a preferred embodiment of the invention, a magnetic recording layer containing as binder components a silane or titanate coupling agent having in its molecule one or more carbon-carbon unsaturated bonds polymerizable by electron beams and a compound curable by electron beams is formed on a base, and when the magnetic layer is irradiated with electron beams, there occurs a surprising increase in the dispersibility of the ferromagnetic particles. Also, the magnetic coating composition has an excellent pot life with minimum precipitation and aggregation of ferromagnetic particles and thus produces a magnetic tape having greatly improved electrical characteristics and wear resistance.

DETAILED DESCRIPTION OF THE INVENTION

The compound having an unsaturated bond polymerizable by electron beams is a compound having one or more carbon-carbon unsaturated bonds. Examples are compounds containing an acryloyl group, acrylamido group, allyl group, vinyl ether group or vinyl thioether group, and unsaturated polyesters. Specific examples include acrylic acid, methyl acrylate and homologous acrylic acid alkyl esters; styrene and homologous α-methylstyrene and β-chlorostyrene; acrylonitrile, vinyl acetate, and vinyl propionate. Two or more unsaturated bonds may be present in the molecule. Examples of such compounds are found in *Kankosei Jushi Data-Shu (A List of Data on Photosensitive Resins)*, published by Sogo Kagaku Kenkyusho, December 1968, pp. 235–236. Particularly preferred compounds are unsaturated esters of polyols such as ethylene diacrylate, diethylene glycol diacrylate, glycerol triacrylate, ethylene diacrylate and pentaerythritol tetraacrylate, and glycidyl acrylate having an epoxy ring. A compound having one unsaturated bond in the molecule may be used in combination with a compound having two or more unsaturated bonds.

These compounds are oligomeric compounds as desribed below. Particularly preferred compounds are those which have an acrylate group at terminal ends of the straight chain or the side chain, and such compounds are disclosed in A. Vrancken, *Fatipec Congress*, Vol. 11, p. 19 (1972). An example is represented below:

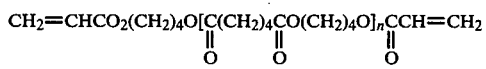

The polyester unit of the above formula may be replaced by a polyurethane unit, epoxy resin unit, polyether unit and polycarbonate unit, or a mixture thereof. These compounds preferably have a degree of polymerization of 5 to 200 (n=5 to 200), but are not limited to those having the above degree of polymerization.

A mixture of the above named monomers and polymers may be used as the compound polymerizable by electron beams. The amount of polymerizable compound (e.g., the sum of the monomer and polymer) is preferably from 1 to 0.1 part by weight, more preferably from 0.5 to 0.2 part by weight, per part by weight of the ferromagnetic particles.

The coupling agent having a carbon-carbon unsaturated bond is (a) a silane coupling agent wherein one terminal group of the silane molecule is a halogen or an alkoxy, such as methoxy or ethoxy, and the other terminal group is an alkyl group having an unsaturated group, such as a vinyl group or acryloyloxy group; or (b) a titanate coupling agent wherein at least one substituent in the titanate molecule is an alkoxy group, such as isopropyl ether group or oxyacetate group, and at least one other substituent is a substituent having an unsaturated bond such as acrylate group or crotonate group. It is believed that these coupling agents provide bridging of an organic material and an inorganic material by a strong chemical bond. Specific examples include silane coupling agents such as vinyl trichlorosilane, vinyl trimethoxysilane, vinyl triethoxysilane, methyl vinyl trichlorosilane, vinyl-tris(2-methoxyethoxy)silane, γ-acryloxypropyl-tris(2-methoxyethoxy)silane, γ-acryloxypropyl tributoxysilane and γ-acryloxypropyl trimethoxysilane; and titanate coupling agents such as isopropyl triacryl titanate, isopropyl tricrotontitanate, isopropyl diacrylcroton titanate, diisopropyl diacryl titanate and tetra(2,2-diacryloxymethyl-1-butyl)bis(ditridecylphosphite)titanate.

Suitable ferromagnetic particles include finely divided ferromagnetic iron oxide, chromium dioxide, and metal alloys. The ferromagnetic iron oxide and chromium dioxide particles have a length to breadth ratio of from about 2/1 to 20/1, and preferably at least 5/1, and an average length of from about 0.2 to 2.0 μm. The ferromagnetic alloy particles are such that at least 75 wt% thereof is metal and at least 80 wt% of the metal is a ferromagnetic metal (i.e., Fe, Co, Ni, Fe-Co, Fe-Ni, Co-Ni, or Fe-Co-Ni) and have a major axis of not more than about 1.0 μm.

Suitable organic solvents include ketones such as acetone, methyl ethyl ketone, methyl isobutyl ketone and cyclohexanone; esters such as methyl acetate, ethyl acetate, butyl acetate, ethyl lactate, and glycol acetate monoethyl ether; ethers and glycol ethers such as glycol dimethyl ether, glycol monoethyl ether and dioxane; aromatic hydrocarbons such as benzene, toluene and xylene; and chlorinated hydrocarbon such as methylene chloride, ethylene chloride, carbon tetrachloride, chloroform, ethylene chlorohydrin, and dichlorobenzene.

The amount of organic solvents varies widely depending upon the type of binder used. For example, when the binder comprises predominantly monomers, a relatively small amount of solvent is required, whereas when the binder comprises predominantly polymers, a relatively large amount of solvent is required.

In addition to the above binder components, if desired, thermoplastic resins such as vinyl chloride/vinyl acetate copolymer, cellulosic resins, acetal resins, vinyl chloride/vinylidene chloride resins, urethane resins and acrylonitrile butadiene resins may be added alone or in admixture to the magnetic coating composition of the present invention in order to achieve the desired mechanical strength of the resulting magnetic layer.

The coupling agent of the present invention can be used in any of the following manners: (1) the four components described above can be added simultaneously and blended to form a magnetic dispersion; (2) the magnetic particles can be dispersed in the organic solvent together with the coupling agent before addition of the binder (preliminary dispersion); and (3) the ferromagnetic particles can be preliminarily treated with the coupling agent and dried (preliminary treatment). The use of the preliminarily treated ferromagnetic particles is particularly preferred.

The coupling agent is generally used in an amount of from 0.1 to 5 wt%, and preferably from 0.5 to 3 wt%, based on the weight of the ferromagnetic particles. If the amount of the coupling agent is less than the lower limit, the dispersibility of the ferromagnetic particles is decreased, and if the amount of coupling agent is more than the upper limit, the resulting magnetic layer has low mechanical strength, which is typically represented by short "still life" (described hereinafter).

After coating a magnetic composition, the magnetic layer can be smoothed whereby electric properties can be markedly improved. For smoothing the surface of the magnetic layer, calendering can be performed with two mirror finishing rolls or with a mirror finishing roll and an elastic roll. The mirror finishing roll can be a metal roll, and the elastic roll can be a cotton roll or synthetic resin (e.g., nylon or polyurethane) roll.

Preferably, the magnetic layer is calendered with a train of 30 rolls at a nip pressure of from about 25 to 400 kg/cm, preferably from 50 to 100 kg/cm, at a temperature of from about 10° to 150° C., and more preferably from 10° to 70° C., and at a rate of from 5 to 200 m/min. Higher temperatures and nip pressures result in magnetic layer shedding or base deformation. If the calendering speed is less than about 5 m/min., the desired smoothing effect is not achieved, and if it is more than about 200 m/min., the smoothing operation becomes difficult.

In the process of the present invention, removal of organic solvent, smoothing of magnetic layer and irradiation with electron beams can be effected in any order. Thus, the magnetic layer is smoothed by mirror finishing rolls before or after the organic solvent is removed from the magnetic layer. The removal of organic solvent can be effected before and/or after irradiation with electron beams. The organic solvent may be completely or partially removed. For instance, the magnetic medium after coating is left to stand or dried under ordinary conditions to remove all or part of the organic solvent, and then the medium is smoothed.

The magnetic coating composition of the present invention may further contain suitable additives such as lubricant, abrasive, corrosion inhibitor, or antistat (i.e., antistatic agent). Examples of useful lubricants are a saturated or unsaturated higher aliphatic acid, aliphatic acid ester, higher aliphatic acid amide, higher alcohol, silicone oil, mineral oil, edible oil, and fluorine-containing compound. These lubricants may be added at the time that the magnetic coating composition is prepared. Alternatively, they can be spread or sprayed onto the magnetic layer after drying, smoothing, or curing (by electron beams) thereof, either directly or in the form of a solution in an organic solvent.

The magnetic coating composition can be prepared by charging a mixer with the magnetic particles and all other ingredients simultaneously or sequentially. Alternatively, dispersant may be added simultaneously with the magnetic powder, then the compound that can be polymerized and cured by electron beams, and then the thermoplastic resin may be added.

Various mixers can be used to achieve thorough mixing of the magnetic coating composition. Examples are a two-roll mill, ball mill, sand grinder, disperser, high-speed impeller disperser and high-speed mixer homogenizer.

A magnetic layer can be formed from the magnetic coating composition on a non-magnetic base by doctor coating, blade coating, air knife coating, squeeze coating, reverse roll coating and gravure coating. The magnetic coating composition is applied to the base to form a magnetic layer having a dry thickness of from about 0.5 to 15 μm. The dry thickness of the magnetic layer is determined by the use, shape, and other specifications of the magnetic recording medium.

The magnetic layer thus formed on the base is dried after the magnetic particles in the coating are optionally oriented in an a.c. or d.c. magnetic field having a magnetizing force of from about 500 to 3,000 Oe.

The oriented magnetic layer is generally dried at between about 50° and 120° C., and preferably between 70° and 100° C., more preferably between 80° and 90° C., for a duration of from about 30 seconds to 10 minutes, preferably from 1 to 5 minutes, with air supplied at a rate of 1 to 5 kiloliters/m², preferably 2 to 3 kiloliters/m². Before the drying, the surface of the magnetic layer can be smoothed by a magnet smoother, smoothening coil, smoothening blade or smoothening blanket.

Suitable non-magnetic bases include polyesters such as polyethylene terephthalate and polyethylene-2,6-naphthalate; polyolefins such as polyethylene and polypropylene; cellulose derivatives such as cellulose triacetate; polycarbonate, polyimide and polyamideimide; non-magnetic metals such as aluminum, copper, tin, zinc and non-magnetic alloys including the same; paper, and paper coated or laminated with polyolefins. The non-magnetic base may be in the form of a film, tape, sheet, disc, card, drum or other suitable shapes, and a suitable material can easily be selected from among the various possible materials depending on the desired form and properties. The back surface (opposite the side having the magnetic layer) of the base may be provided with a back coating for various purposes, e.g., prevention of static buildup, transfer, and wow flutter, as well as improvement of the strength of the magnetic recording medium and the matting of the back surface.

Suitable electron beam accelerators include a Van de Graaff scanning accelerator, double scanning accelerator and curtain beam accelerator. A curtain beam accelerator is preferred because of its low price and high power output. The acceleration voltage is generally from 100 to 1,000 kilovolts, and preferably from 150 to 300 kilovolts. The absorbed dose is generally from 0.5 to 20 megarads, preferably from 2 to 10 megarads. An acceleration voltage lower than 100 kilovolts causes insufficient energy transmission, and a voltage higher than 1,000 kilovolts reduces the energy necessary for polymerization. If the absorbed dose is less than 0.5 megarad, the curing reaction is not sufficient to provide a magnetic medium having high strength, and if the dose is greater than 20 megarads, the efficiency of energy used for curing is reduced, or the web being irradiated generates heat, and in particular, the plastic base deforms.

According to the present invention, a magnetic recording medium having a smooth magnetic layer and having surprisingly good wear resistance and electrical characteristics can be produced.

The present invention is now described in greater detail by reference to the following examples and comparative examples which are provided here for illustrative purposes only, and are not intended to limit its scope. In the examples and comparative examples, all parts are by weight.

EXAMPLE 1

A composition having the formulation indicated below was agitated in a ball miil for 50 hours.

| | parts |
|---|---|
| $\gamma$-$Fe_2O_3$ (preliminarily treated with 2 parts of vinyl trichlorosilane in methyl ethyl ketone) | 100 |
| Nitrocellulose (RS ½H of Daicel Ltd.) | 10 |
| Urethane resin (condensate of adipic acid, butanediol and tolylene diisocyanate) | 10 |
| Ester acrylate oligomer (Aronix M 6100 of Toagosei Chemical Co., Ltd.) | 2 |
| Hexamethylene diacrylate | 2 |
| Methyl ethyl ketone | 250 |
| Stearic acid | 1 |
| Butyl stearate | 1 |

The resulting coating composition was applied to a polyethylene terephthalate base (20μ thick) by a doctor blade to form a magnetic layer in a dry thickness of 8μ. The magnetic particles were oriented with a cobalt magnet, and the web was dried at 100° C. for one minute to eliminate the solvent. The web was passed through a 5-roll calender mill (cotton rolls and mirror finishing rolls) to smooth the magnetic layer (roll temperature: 40° C., nip pressure: 100 kg/cm). The web was then irradiated with electron beams to provide an absorbed dose of 5 megarads (acceleration voltage: 200 kilovolts, beam current: 10 milliamperes). The resulting tape was referred to as Sample No. 1

COMPARATIVE EXAMPLE 1

A magnetic tape was prepared as in Example 1 except that the $\gamma$-$Fe_2O_3$ particles were not treated with trichlorosilane. The tape was referred to as Sample No. 2.

EXAMPLE 2

A magnetic tape was prepared as in Example 1 except that the $\gamma$-$Fe_2O_3$ particles were treated with one part of vinyl trimethoxysilane. The tape was referred to as Sample No. 3.

COMPARATIVE EXAMPLE 2

A magnetic tape was prepared as in Example 1 except that the $\gamma$-$Fe_2O_3$ particles were treated with 2 parts of ethyl trichlorosilane. The tape was referred to as Sample No. 4.

EXAMPLE 3

A magnetic tape was prepared as in Example 1 except that the $\gamma$-$Fe_2O_3$ particles were treated with 3 parts of isopropyl triacyl titanate. The tape was referred to as Sample No. 5.

The samples of Examples 1 to 3 and Comparative Examples 1 and 2 were subjected to still life and squareness ratio (residual flux density/maximum flux density) measurements with a video tape recorder. The magnetic coating compositions from which the respective magnetic layers were produced were left to stand for 24 hours to check their stability. The test results are shown in Table 1. Still life measurement: The still life was evaluated by reproducing a still video image from the tape samples in VHS video tape recorder (Model HR 3600 of Victor Company of Japan, Ltd.) and by measuring the time before the image lost its brightness (23° C., relative humidity 65%).

TABLE 1

| Sample No. | Still Life | Squareness Ratio | Stability of Magnetic Coating Composition |
|---|---|---|---|
| 1 | More than 60 min. | 0.82 | No change |
| 2 | 10 min. | 0.71 | Separated into two layers |
| 3 | More than 60 min. | 0.83 | No change |
| 4 | 40 min. | 0.82 | No change |
| 5 | More than 60 min. | 0.81 | No change |

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording medium which comprises the steps of applying onto a non-magnetic base a magnetic coating composition consisting essentially of (1) a compound having a carbon-carbon unsaturated bond polymerizable by electron beams, (2) a coupling agent having a carbon-carbon unsaturated bond selected from the group consisting of (a) a silane coupling agent wherein one terminal group of the silane molecule is a hydrogen or alkoxy and the other terminal group is an alkoxy group having an unsaturated group, and (b) a titanate coupling agent wherein at least one substituent in the titanate molecule is an alkoxy group and at least one other substituent is a substituent having an unsaturated bond, (3) ferromagnetic particles and (4) an organic solvent, and curing the applied magnetic coating composition by irradiation with electron beams.

2. A process according to claim 1, wherein said coupling agent having a carbon-carbon unsaturated bond is (1) a silane coupling agent selected from the group consisting of vinyl trichlorosilane, vinyl trimethoxysilane, vinyl triethoxysilane, methyl vinyl trichlorosilane, vinyl-tris(2-methoxyethoxy)silane, $\gamma$-acryloxypropyl-tris(2-methoxyethoxy)silane, $\gamma$-acryloxypropyl tributoxysilane and $\gamma$-acryloxypropyl trimethoxysilane, or (2) a titanate coupling agent selected from the group consisting isopropyl triacryl titanate, isopropyl tricroton titanate, isopropyl diacrylcroton titanate, diisopropyl diacryl titanate and tetra(2,2-diacryloxymethyl-1-butyl)bis (ditridecyl-phosphite)titanate.

3. A process according to claim 1, wherein said coupling agent having a carbon-carbon unsaturated bond is vinyl trichlorosilane, vinyl trialkoxysilane or isopropyl triacrylitatanate.

4. A process according to claim 1, wherein said compound having a carbon-carbon unsaturated bond polymerizable by electron beams has an acryolyl group at terminal ends of the straight chain or the side chain.

5. A process according to claim 1, wherein the magnetic coating composition is irradiated with electron beams at an acceleration voltage of from 100 to 1,000 kilovolts to provide an absorbed dose of from 0.5 to 20 megarads.

6. A process according to claim 1, wherein the magnetic coating composition is irradiated with electron beams at an acceleration voltage of 150 to 300 kilovolts to provide an absorbed dose of from 2 to 10 megarads.

7. A process according to claim 1, 3, 4, 5, or 6, wherein the amount of polymerizable compound is from 1 to 0.1 part by weight and the amount of coupling agent is from 0.1 to 5 part by weight per part by weight of the ferromagnetic particles.

8. A process according to claim 1, 3, 4, 5, or 6, wherein the amount of polymerizable compound is from 0.5 to 0.2 part by weight and the amount of coupling agent is from 0.5 to 3 part by weight per part by weight of the ferromagnetic particles.

9. A magnetic recording medium produced by the steps of applying onto a non-magnetic base a magnetic coating composition consisting essentially of (1) a compound having a carbon-carbon unsaturated bond polymerizable by electron beams, (2) a coupling agent having a carbon-carbon unsaturated bond selected from the group consisting of (a) a silane coupling agent wherein one terminal group of the silane molecule is a hydrogen or alkoxy and the other terminal group is an alkoxy group having an unsaturated group, and (b) a titanate coupling agent wherein at least one substituted in the titanate molecule is an alkoxy group and at least one other substituent is a substituent having an unsaturated bond, (3) ferromagnetic particles, and (4) an organic solvent, and curing the applied magnetic coating composition by irradiation with electron beams.

* * * * *